United States Patent
Fujishiro et al.

(10) Patent No.: US 10,624,069 B2
(45) Date of Patent: Apr. 14, 2020

(54) RADIO TERMINAL, BASE STATION, AND PROCESSOR

(71) Applicant: KYOCERA CORPORATION, Kyoto (JP)

(72) Inventors: Masato Fujishiro, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/810,466

(22) Filed: Nov. 13, 2017

(65) Prior Publication Data

US 2018/0084542 A1 Mar. 22, 2018

Related U.S. Application Data

(63) Continuation of application No. PCT/JP2016/063393, filed on Apr. 28, 2016.

(60) Provisional application No. 62/162,142, filed on May 15, 2015.

(51) Int. Cl.
*H04W 72/04* (2009.01)
*H04W 72/12* (2009.01)
*H04L 1/00* (2006.01)
*H04L 1/18* (2006.01)
*H04W 52/14* (2009.01)

(52) U.S. Cl.
CPC ........... *H04W 72/0413* (2013.01); *H04L 1/00* (2013.01); *H04L 1/0023* (2013.01); *H04L 1/0026* (2013.01); *H04L 1/1812* (2013.01); *H04L 1/1861* (2013.01); *H04W 52/146* (2013.01); *H04W 72/1268* (2013.01); *H04W 72/1284* (2013.01); *H04W 72/1252* (2013.01)

(58) Field of Classification Search
CPC ......... H04W 72/0413; H04W 72/0486; H04W 72/1284
See application file for complete search history.

(56) References Cited

U.S. PATENT DOCUMENTS

| | | |
|---|---|---|
| 2010/0322187 A1 | 12/2010 | Tani et al. |
| 2012/0213196 A1 | 8/2012 | Chung et al. |
| 2017/0086219 A1* | 3/2017 | Lee ........................ H04W 72/12 |
| 2017/0215201 A1* | 7/2017 | Kim ................... H04W 72/1268 |
| 2018/0227938 A1* | 8/2018 | Lee ........................... H04L 5/00 |

FOREIGN PATENT DOCUMENTS

JP 2011-250481 A 12/2011

OTHER PUBLICATIONS

International Search Report issued in PCT/JP2016/063393; dated Jun. 7, 2016.

(Continued)

*Primary Examiner* — Pao Sinkantarakorn
(74) *Attorney, Agent, or Firm* — Studebaker & Brackett PC

(57) ABSTRACT

A radio terminal that transmits uplink data to a base station using a PUSCH resource includes a controller configured to execute a process of transmitting a scheduling request for requesting allocation of the PUSCH resource to the base station using a PUCCH resource. The scheduling request includes buffer information indicating an amount of the uplink data in a transmission buffer of the radio terminal.

10 Claims, 11 Drawing Sheets

(56) References Cited

OTHER PUBLICATIONS

CATT; Impact of carrier aggregation on MAC layer; 3GPP TSG-RAN WG2 #67bis; R2-095484; Oct. 12-16, 2009; pp. 1-6; Miyazaki, Japan.
3rd Generation Partnership Project; Technical Specification Group Radio Access Network; Evolved Universal Terrestrial Radio Access (E-UTRA); Medium Access Control (MAC) protocol specification (Release 8); 3GPP TS 36.321 V8.12.0; Mar. 2012; pp. 1-4; 3GPP Organizational Partners.
Institute for Information Industry (III); Combined SR with BSR for reducing UP latency; 3GPP TSG-RAN WG2 Meeting #91; R2-153416; Aug. 24-28, 2015; pp. 1-5; Beijing, China.
Kyocera; Initial consideration of fast uplink access solution; 3GPP TSG-RAN WG2 #91; R2-153405; Aug. 24-28, 2015; pp. 1-6; Beijing, China.
LG Electronics Inc.; Potential area for Latency Reduction; 3GPP TSG-RAN WG2 Meeting #91; R2-153161; Aug. 24-28, 2015; pp. 1-5; Beijing, China.

\* cited by examiner

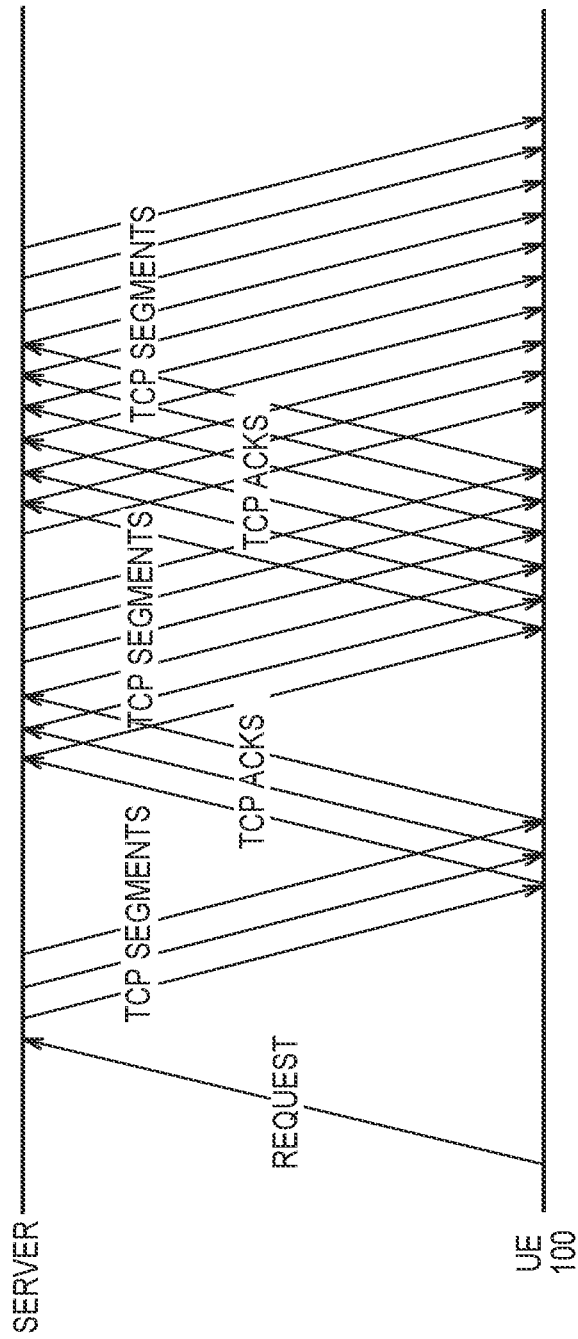

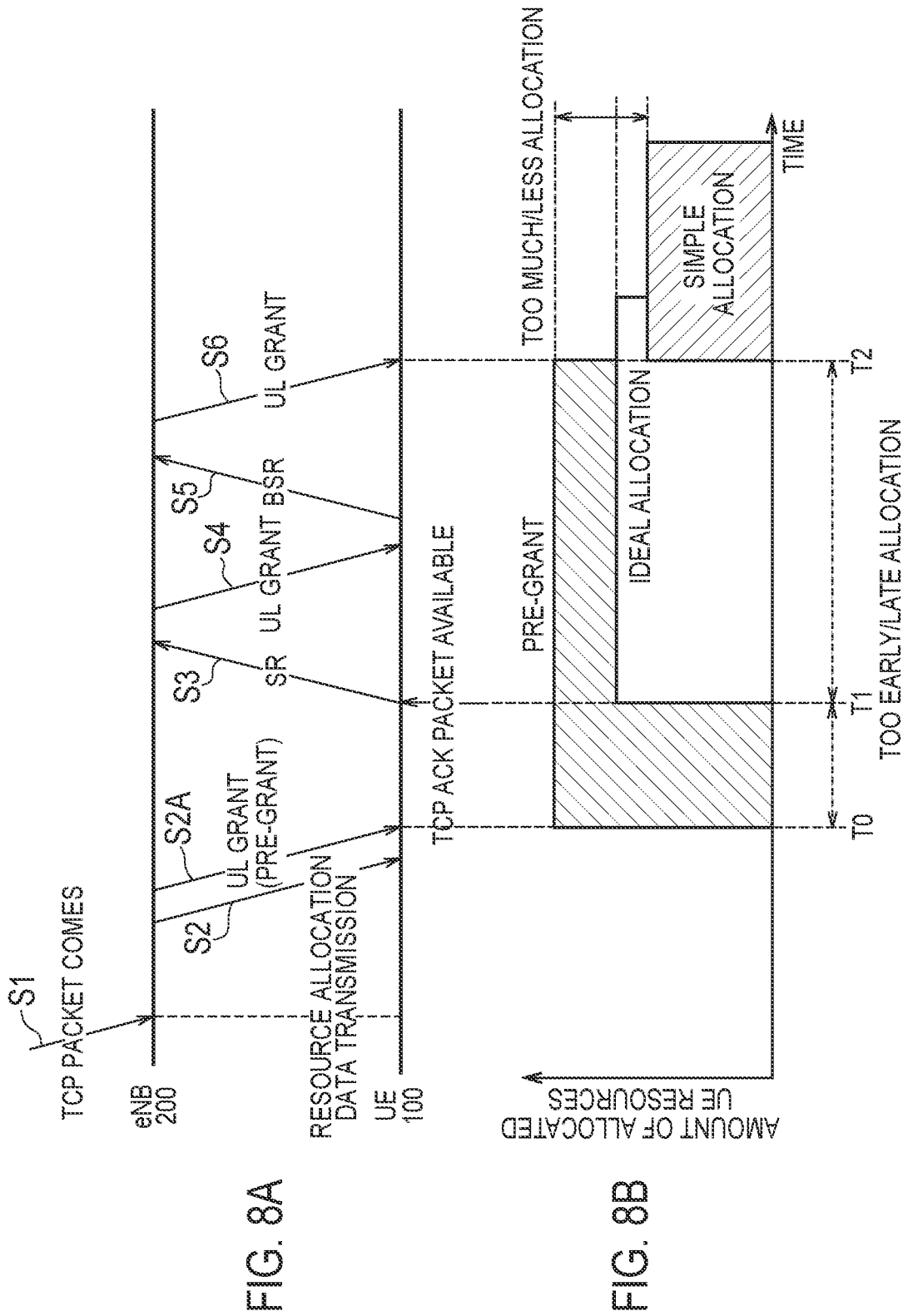

FIG. 11
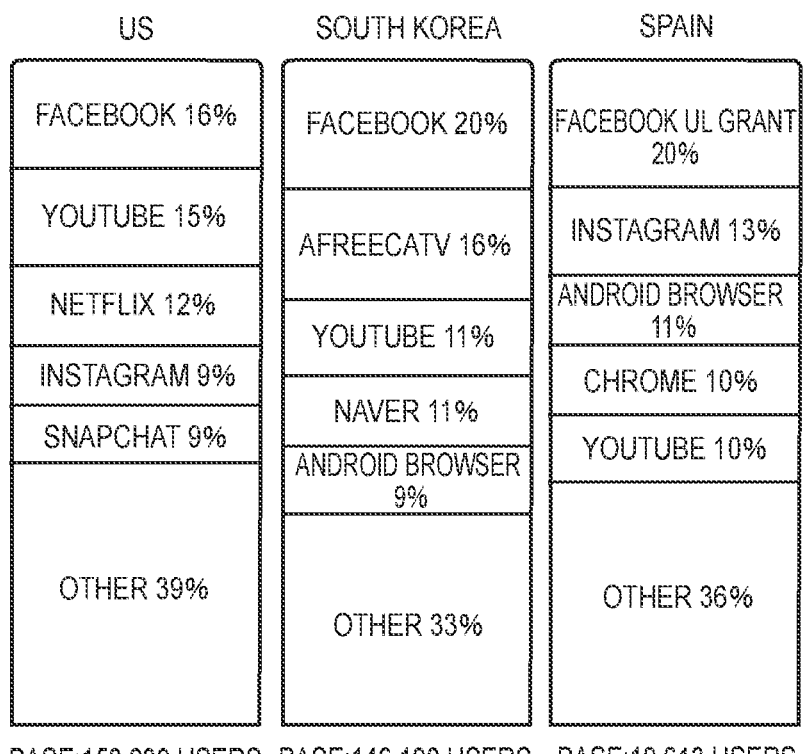
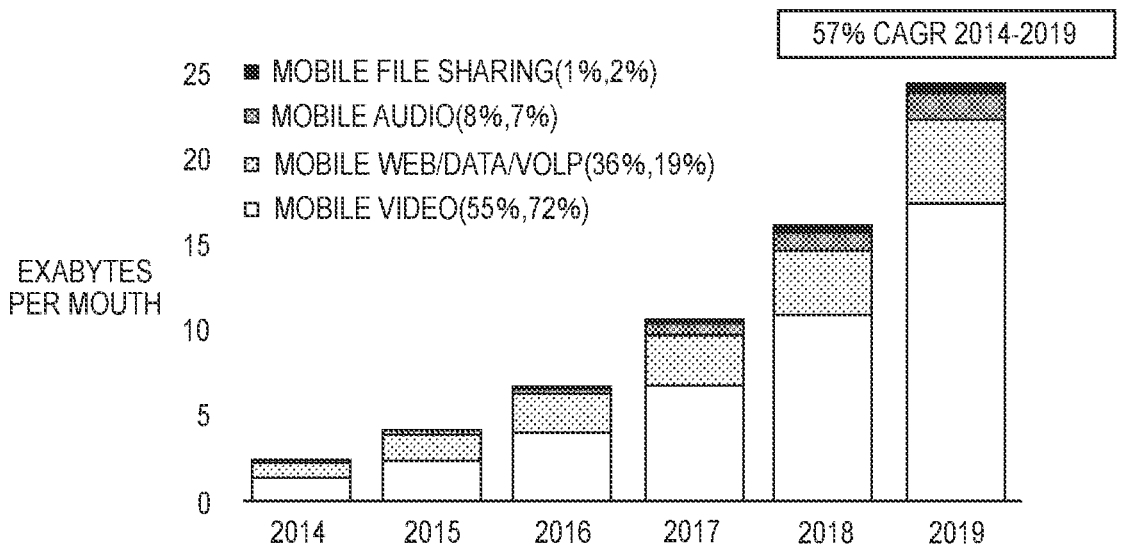

RADIO TERMINAL, BASE STATION, AND PROCESSOR

CROSS-REFERENCE TO RELATED APPLICATION

The present application is a continuation based on PCT Application No. PCT/JP2016/063393 filed on Apr. 28, 2016, which claims the benefit of U.S. Provisional Application No. 62/162,142 (filed on May 15, 2015). The content of which is incorporated by reference herein in their entirety.

FIELD

The present application relates to a radio terminal, a base station, and a processor used in a mobile communication system.

BACKGROUND

In 3GPP (Third Generation Partnership Project) which is a project aiming to standardize a mobile communication system, the introduction of a latency reduction function of reducing latency in radio communication has been discussed. A technology for realizing such a latency reduction function may include a high-speed uplink access technology, a TTI (Transmission Time Interval) shortening technology, or the like.

SUMMARY

A radio terminal according to one embodiment uses a PUSCH resource to transmit uplink data to a base station. The radio terminal comprises a controller configured to perform a process of transmitting, to the base station, by using a PUCCH resource, a scheduling request for requesting allocation of the PUSCH resource. The scheduling request includes buffer information indicating an amount of the uplink data in a transmission buffer of the radio terminal.

A base station according to one embodiment uses a PUSCH resource to receive uplink data from a radio terminal. The base station comprises a controller configured to perform a process of receiving, from the radio terminal, by using a PUCCH resource, a scheduling request for requesting allocation of the PUSCH resource. The scheduling request includes buffer information indicating an amount of the uplink data in a transmission buffer of the radio terminal.

A processor according to one embodiment controls a radio terminal configured to use a PUSCH resource to transmit uplink data to a base station. The processor executes a process of transmitting, to the base station, by using a PUCCH resource, a scheduling request for requesting allocation of the PUSCH resource. The scheduling request includes buffer information indicating an amount of the uplink data in a transmission buffer of the radio terminal.

BRIEF DESCRIPTION OF THE DRAWINGS

FIG. 7 is a diagram for describing an overview of a TCP.

FIGS. 8A and 8B are diagrams for describing a general uplink transmission procedure.

FIG. 11 is a diagram according to the appendix of the embodiment.

DESCRIPTION OF THE EMBODIMENT

Overview of Embodiment

A general uplink transmission procedure includes the following first to third steps.

In the first step, a radio terminal uses a PUCCH (Physical Uplink Control Channel) resource to transmit to a base station a scheduling request (SR) for requesting a PUSCH (Physical Uplink Shared Channel) resource. The base station allocates a PUSCH resource to the radio terminal, in response to reception of the SR.

In the second step, the radio terminal uses the PUSCH resource allocated from the base station to transmit to the base station a buffer status report (BSR) including buffer information indicating an amount of uplink data in a transmission buffer of the radio terminal. The base station allocates an appropriate amount of a PUSCH resource to the radio terminal, in response to reception of the BSR.

In the third step, the radio terminal uses the PUSCH resource allocated from the base station to transmit to the base station the uplink data in the transmission buffer of the radio terminal.

However, such uplink transmission procedure has room for improvement in terms of reducing uplink latency, that is, enabling a high-speed uplink access.

In the embodiment below, a technology for enabling the high-speed uplink access is disclosed.

A radio terminal according to one embodiment uses a PUSCH resource to transmit uplink data to a base station. The radio terminal comprises a controller configured to perform a process of transmitting, to the base station, by using a PUCCH resource, a scheduling request for requesting allocation of the PUSCH resource. The scheduling request includes buffer information indicating an amount of the uplink data in a transmission buffer of the radio terminal.

A base station according to one embodiment uses a PUSCH resource to receive uplink data from a radio terminal. The base station comprises a controller configured to perform a process of receiving, from the radio terminal, by using a PUCCH resource, a scheduling request for requesting allocation of the PUSCH resource. The scheduling request includes buffer information indicating an amount of the uplink data in a transmission buffer of the radio terminal.

A processor according to one embodiment controls a radio terminal configured to use a PUSCH resource to transmit uplink data to a base station. The processor executes a process of transmitting, to the base station, by using a PUCCH resource, a scheduling request for requesting allocation of the PUSCH resource. The scheduling request includes buffer information indicating an amount of the uplink data in a transmission buffer of the radio terminal.

Embodiments (Configuration of Mobile Communication System)

Figure 1:
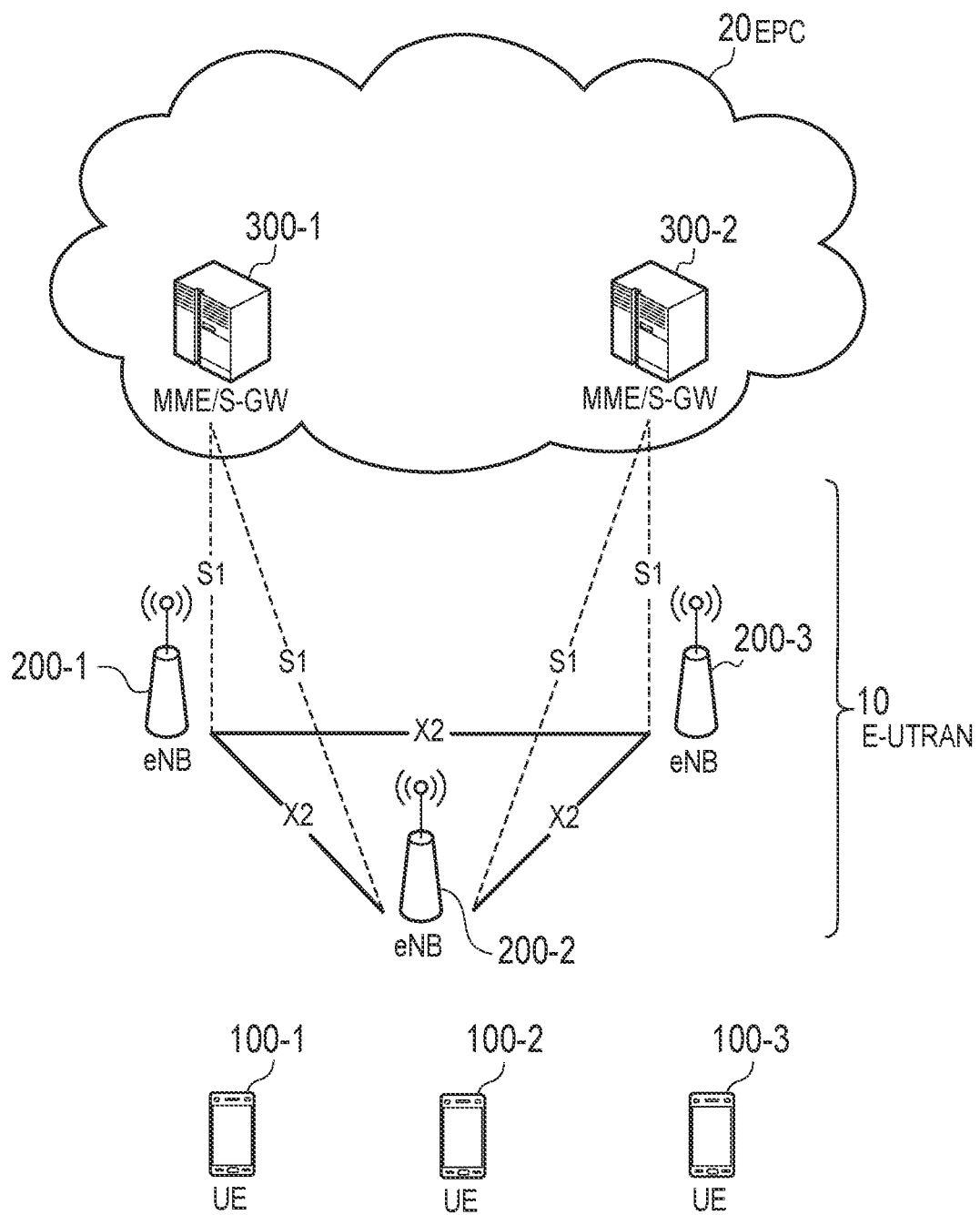
FIG. 1 is a diagram illustrating an LTE system (mobile communication system) according to an embodiment.

FIG. 1 is a diagram illustrating a configuration of a LTE (Long Term Evolution) system which is a mobile communication system according to the embodiments. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell).

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

(Configuration of Radio Terminal)

Figure 2:
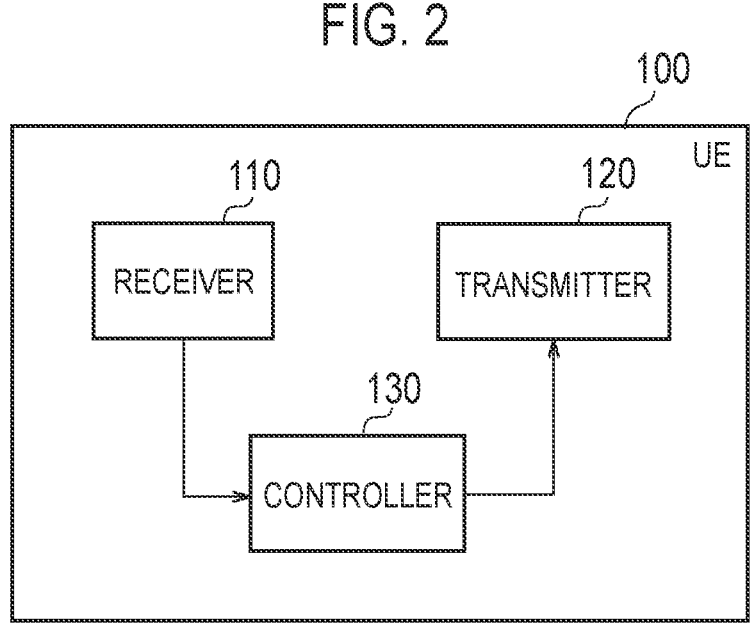
FIG. 2 is a block diagram of a UE (radio terminal) according to the embodiment.

FIG. 2 is a block diagram of the UE 100 (radio terminal). As illustrated in FIG. 2, the UE 100 includes: a receiver 110, a transmitter 120, and a controller 130.

The receiver 110 performs various types of receptions under the control of the controller 130. The receiver 110 includes an antenna and a receiver unit. The receiver unit converts a radio signal received by the antenna into a baseband signal (received signal), and outputs the baseband signal to the controller 130.

The transmitter 120 performs various types of transmissions under the control of the controller 130. The transmitter 120 includes an antenna and a transmitter unit. The transmitter unit converts a baseband signal (transmitted signal) output from the controller 130 into a radio signal, and transmits the radio signal from the antenna.

The controller 130 performs various types of controls in the UE 100. The controller 130 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor may include a codec that performs encoding and decoding on sound and video signals. The processor executes the above-described processes and below-described processes.

(Configuration of Base Station)

Figure 3:
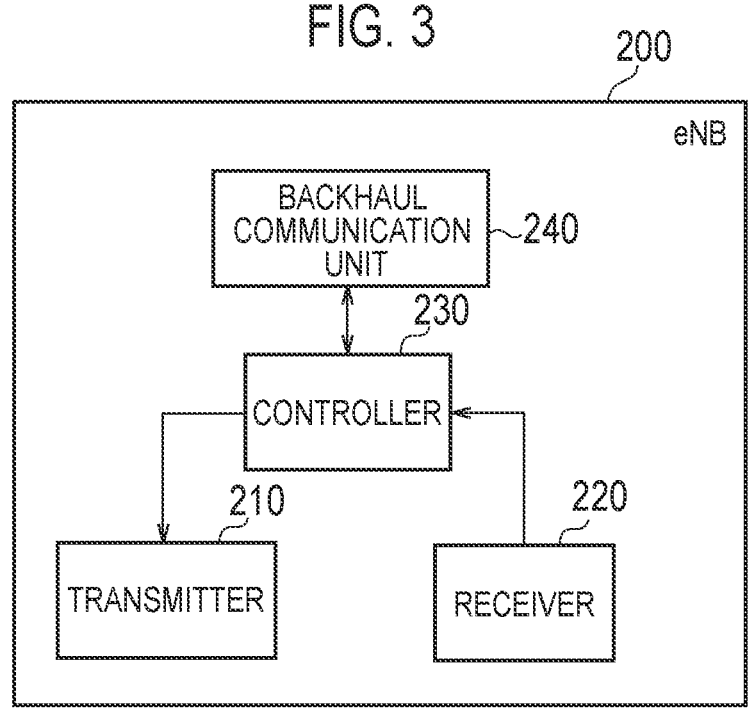
FIG. 3 is a block diagram of an eNB (base station) according to the embodiment.

FIG. 3 is a block diagram of the eNB 200 (base station). As illustrated in FIG. 3, the eNB 200 includes: a transmitter 210, a receiver 220, a controller 230, and a backhaul communication unit 240.

The transmitter 210 performs various types of transmissions under the control of the controller 230. The transmitter 210 includes an antenna and a transmitter unit. The transmitter unit converts a baseband signal (transmitted signal) output from the controller 230 into a radio signal, and transmits the radio signal from the antenna.

The receiver 220 performs various types of receptions under the control of the controller 230. The receiver 220 includes an antenna and a receiver unit. The receiver unit converts a radio signal received by the antenna into a baseband signal (received signal), and outputs the baseband signal to the controller 230.

The controller 230 performs various types of controls in the eNB 200. The controller 230 includes a processor and a memory. The memory stores a program to be executed by the processor, and information to be utilized for a process by the processor. The processor includes a baseband processor that performs modulation and demodulation, encoding and decoding and the like of a baseband signal, and a CPU (Central Processing Unit) that performs various processes by executing the program stored in the memory. The processor executes the above-described processes and below-described processes.

The backhaul communication unit 240 is connected to a neighboring eNB 200 via the X2 interface and is connected to the MME/S-GW 300 via the S1 interface. The backhaul communication unit 240 is used for communication performed on the X2 interface, communication performed on the S1 interface, and the like.

(Configuration of Radio Interface)

Figure 4:
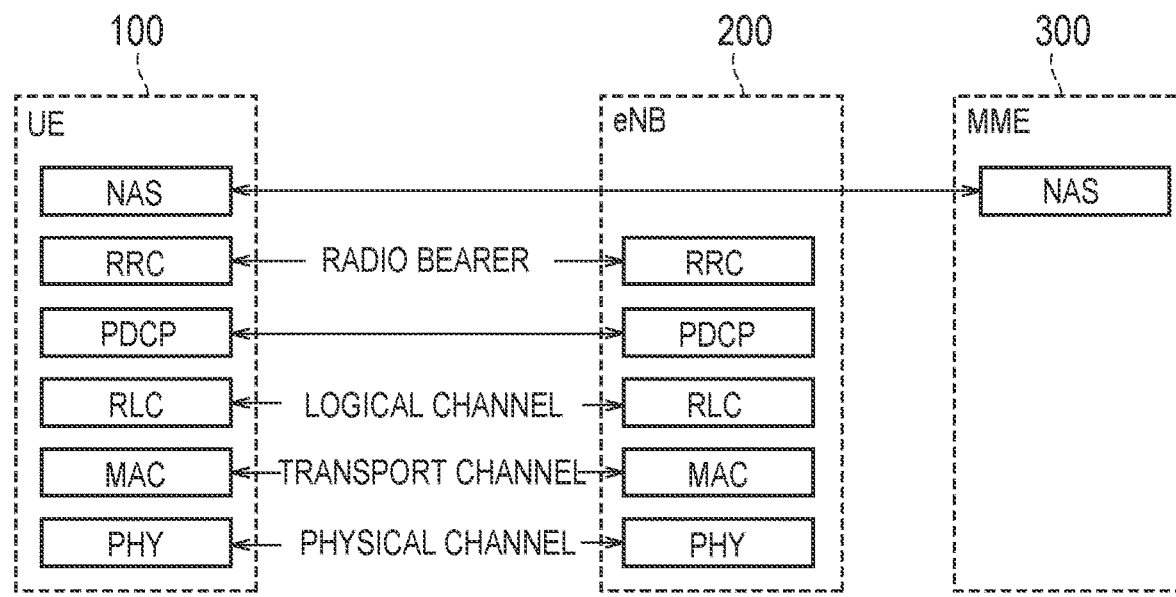
FIG. 4 is a protocol stack diagram of a radio interface in an LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

The UE 100 has fourth to seventh layers of the OSI reference model as the upper protocol of the radio interface protocol. The transport layer which is the fourth layer includes TCP (Transmission Control Protocol). TCP will be described later.

(Overview of Lower Layer of LTE)

Figure 5:
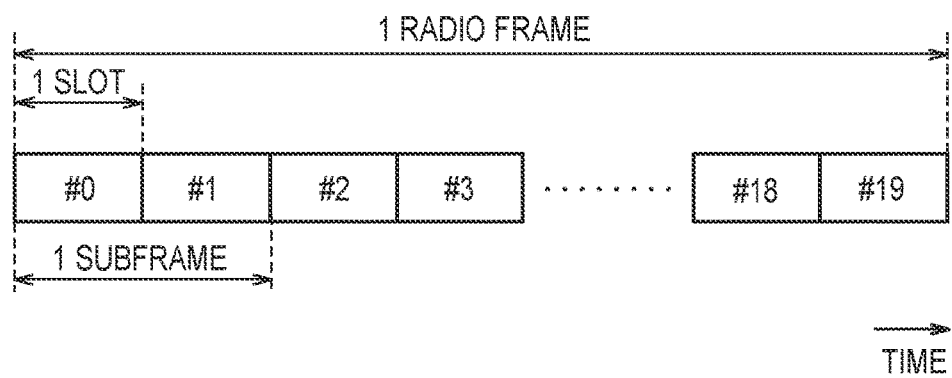
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a region used as a physical downlink control channel (PDCCH) for mainly transmitting control signal. The details of the PDCCH will be described later. Furthermore, the other portion of each subframe is a region available as a physical downlink shared channel (PDSCH) for mainly transmitting downlink data.

In general, the eNB 200 uses the PDCCH to transmit downlink control signal (DCI: Downlink Control Information) to the UE 100, and uses the PDSCH to transmit the downlink data to the UE 100. The downlink control signal carried by the PDCCH includes uplink SI (Scheduling Information), downlink SI, and a TPC bit. The uplink SI is scheduling information related to an allocation of an uplink radio resource (UL grant), and the downlink SI is scheduling information related to an allocation of a downlink radio resource. The TPC bit is information for instructing an increase or decrease in the uplink transmission power. In order to identify a UE 100 to which the downlink control signal is transmitted, the eNB 200 includes, into the downlink control information, a CRC bit scrambled by an identifier (RNTI: Radio Network Temporary ID) of the UE 100 to which the downlink control signal is transmitted. Each UE 100 descrambles, by the RNTI of the UE 100, the CRC bit of the downlink control signal that may be addressed to the UE 100 so as to perform blind decoding of the PDCCH to detect the downlink control signal addressed to the UE 100. The PDSCH carries the downlink data by the downlink radio resource (resource block) indicated by the downlink SI.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data.

In general, the UE 100 uses the PUCCH to transmit uplink control signal (UCI: Uplink Control Information) to the eNB 200, and uses the PUSCH to transmit the uplink data to the eNB 200. The uplink control signal carried by the PUCCH includes a CQI (Channel Quality Indicator), a PMI (Precoding Matrix Indicator), an RI (Rank Indicator), a scheduling request (SR), and a HARQ ACK/NACK. The CQI is an index indicating a downlink channel quality and is used for deciding an MCS to be used for the downlink transmission, for example. The PMI is an index indicating a precoder matrix desirably used for the downlink transmission. The RI is an index indicating the number of layers (the number of streams) available for the downlink transmission. The SR is information for requesting an allocation of a PUSCH resource. The HARQ ACK/NACK is delivery acknowledgment information indicating whether or not the downlink data is correctly received.

(PUCCH)

The PUCCH corresponds to the uplink control channel. As described above, a PUCCH region is provided at both ends, in the frequency direction, in each subframe in the uplink. A radio resource included in the PUCCH region is allocated, as a PUCCH resource, to the UE 100. In the remaining portion of each subframe, a PUSCH region is provided. A radio resource included in the PUSCH region is allocated, as a PUSCH resource, to the UE 100.

One PUCCH resource uses each one resource block in two slots in a subframe. Furthermore, frequency hopping is applied between slots in a subframe, and a diversity effect is obtained between slots. A PUCCH resource is identified by a resource index m.

Further, a plurality of formats (PUCCH formats) are supported. Each PUCCH format carries a different type of control signal, as follows. The number of bits of a control signal that can be transmitted in one subframe differs for each PUCCH format.

PUCCH format 1: SR
PUCCH format 1a/1b: Ack/Nack
PUCCH format 2: CQI/PMI/RI
PUCCH format 2a/2b: CQI/PMI/RI and Ack/Nack Further, a PUCCH format 3 is defined for transmitting a large number of Acks/Nacks.

The modulation scheme and the number of bits per subframe are defined as in the following Table 1.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

(Overview of SR)

The UE 100 uses a PUCCH resource to transmit, to the eNB 200, an SR for requesting a PUSCH resource. In response to reception of the SR, the eNB 200 allocates a PUSCH resource to the UE 100 (that is, the eNB 200 transmits a "UL grant" to the UE 100).

In accordance to $N^{(1)}_{PUCCH,\ SRI}$, which is a PUCCH parameter configured by RRC signaling from the eNB 200, the UE 100 determines a PUCCH resource for transmission of the SR. The parameter is a parameter specific to a UE.

Further, an SR configuration including a transmission periodicity (SR periodicity) and a subframe offset (SR subframe offset) of the SR, is prescribed by an "SR configuration index" that is a parameter configured by RRC signaling from the eNB 200 to the UE 100. The parameter is a parameter specific to a UE. An example of the "SR configuration" is shown in Table 2.

TABLE 2

| SR configuration Index $I_{SR}$ | SR periodicity (ms) $SR_{PERIODICITY}$ | SR subframe offset $N_{OFFSET,SR}$ |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

In the example of Table 2, the periodicity (SR periodicity) of the PUCCH resource for the transmission of the SR is within a range from 1 [ms] to 80 [ms].

For example, the UE 100 can transmit the SR in each subframe satisfying the following equation (1).

[Math. 1]

$$(10 \times n_f + \lfloor n_s/2 \rfloor - N_{OFFSET,SR}) \bmod SR_{PERIODICITY} = 0 \quad (1)$$

wherein "$n_f$" is a system frame number (radio frame number), "$n_s$" is a slot number in the frame (from number 0 to 19), "$N_{OFFSET,SR}$" is a subframe offset (SR subframe offset), and "$SR_{PERIODICITY}$" is an SR periodicity.

(Overview of BSR)

The UE 100 uses a PUSCH resource allocated from the eNB 200 to transmit a BSR to the eNB 200. The BSR includes buffer information (Buffer Size) indicating an amount of uplink data in a transmission buffer (UL buffer) of the UE 100. The BSR is one type of a MAC control element transmitted from the MAC layer of the UE 100 to the MAC layer of the eNB 200. A BSR MAC control element supports a first format and a second format. The first format is used for transmitting a "Short BSR" and a "Truncated BSR". The second format is used for transmitting a "Long BSR".

Figure 6A:
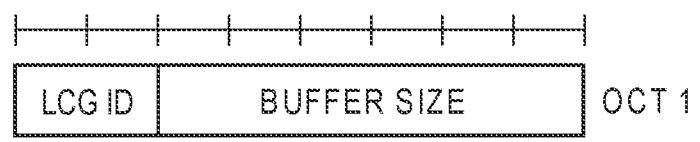
FIGS. 6A and 6B are diagrams for describing a BSR MAC control element.

FIGS. 6A are 6B are diagrams for describing the BSR MAC control element.

As illustrated in FIG. 6A, the first format of the BSR MAC control element includes one "LCG ID" field and one "Buffer Size" field. The "LCG ID" is an ID identifying a group of the logical channels, and has a bit length of two bits. The "Buffer Size" is an index indicating a data amount of all logical channels in a group corresponding to the "LCG ID", and has a bit length of six bits. An example of a correspondence relationship between the index and the data amount (buffer size value) is shown in Table 3.

TABLE 3

| Index | Buffer Size (BS) value [bytes] |
|---|---|
| 0 | BS = 0 |
| 1 | 0 < BS <= 10 |
| 2 | 10 < BS <= 12 |

TABLE 3-continued

| Index | Buffer Size (BS) value [bytes] |
|---|---|
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79869 < BS <= 93479 |
| 60 | 93479 < BS <= 109439 |
| 61 | 109439 < BS <= 128125 |
| 62 | 128125 < BS <= 150000 |
| 63 | BS > 150000 |

Figure 6B:
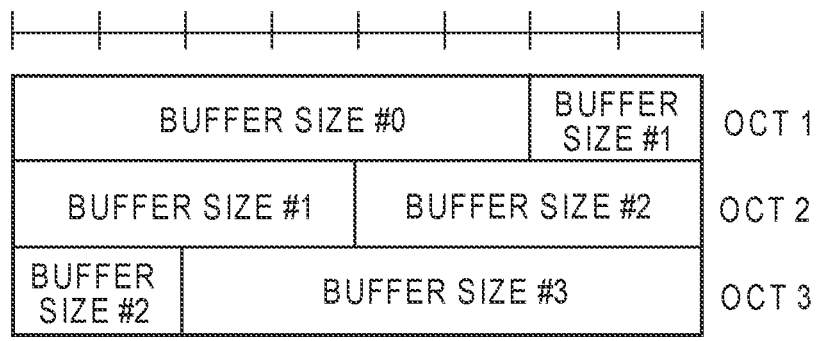

As illustrated in FIG. 6B, the second format of the BSR MAC control element includes four "Buffer Size" fields. The "Buffer Size" field is provided correspondingly to "LCG ID #0" to "LCG ID #3". According to the second format of the BSR MAC control element, one BSR can indicate each data amount of four "LCG IDs".

(Overview of TCP)

FIG. 7 is a diagram for describing an overview of the TCP. In the embodiment, the UE 100 performs TCP communication, via a network of the LTE system, with a server on the Internet.

As illustrated in FIG. 7, the server determines a congestion state of the network, based on a "TCP ACK" from the UE 100. The server gradually increases a window size, in response to reception of the "TCP ACK". The window size is an amount of a "TCP Segment" to be continuously transmitted without waiting for the "TCP ACK". On the other hand, upon failing to receive the "TCP ACK" (timeout), the server halves the window size. Such a control is referred to as "slow start".

Thus, even if the downlink of the LTE system is not congested, unless the UE 100 quickly transmits the "TCP ACK" in the uplink, it is not possible to enhance a downlink TCP throughput. That is, if it is possible to shorten a delay time (uplink latency) from generation of the "TCP ACK" in the UE 100 to the completion of the transmission of the "TCP ACK" to the eNB 200, it is possible to enhance the downlink TCP throughput. Here, for transmitting the "TCP ACK" from the UE 100 to the eNB 200, it is necessary to allocate an appropriate amount of uplink resources (specifically, the PUSCH resources) from the eNB 200 to the UE 100.

(General Uplink Transmission Procedure)

FIGS. 8A are 8B are diagrams for describing a general uplink transmission procedure. In FIGS. 8A and 8B, the UE 100 is in a state of establishing the RRC connection with the eNB 200 (that is, the RRC connected mode).

As illustrated in FIG. 8A, in step S1, the eNB 200 receives a TCP packet (TCP segment) from the EPC 20.

In step S2, the eNB 200 uses a PDCCH resource to allocate a PDSCH resource to the UE 100. Further, the eNB 200 uses a PDSCH resource to transmit to the UE 100 downlink data corresponding to the TCP packet received from the EPC 20. Specifically, the eNB 200 transmits, on a PDCCH, DCI including downlink SI to the UE 100, and uses a PDSCH resource indicated by the DCI to transmit downlink data to the UE 100.

At this stage, the eNB 200 may allocate, by using a PDCCH resource, a (periodic) PUSCH resource to the UE 100 beforehand (step 52A). Specifically, the eNB 200 may transmit, on a PDCCH, DCI including uplink SI (UL grant), to the UE 100. Such a technique may be referred to as "Pre-grant". It is noted that the following steps S3 to S6 correspond to an operation when the "Pre-grant" is not performed.

The UE 100 receives the downlink data and moves the downlink data to an upper layer of the UE 100. The upper layer of the UE 100 generates a TCP ACK to be notified to a lower layer of the UE 100. The UE 100 determines to request the eNB 200 to allocate a PUSCH resource, in response to the presence of uplink data (a TCP ACK packet) in a transmission buffer (the lower layer of the UE 100).

In step S3, the UE 100 uses a PUCCH resource to transmit to the eNB 200 an SR for requesting the allocation of the PUSCH resource.

In step S4, the eNB 200 allocates the PUSCH resource to the UE 100, in response to reception of the SR.

In step S5, the UE 100 uses the PUSCH resource allocated from the eNB 200 to transmit to the eNB 200 a BSR including buffer information indicating an amount of the uplink data in the transmission buffer of the UE 100.

In step S6, the eNB 200 allocates an appropriate amount of a PUSCH resource to the UE 100, in response to reception of the BSR. The UE 100 uses the PUSCH resources allocated from the eNB 200 to transmit to the eNB 200 the uplink data (TCP ACK packet) in the transmission buffer of the UE 100.

FIG. 8B illustrates the uplink resource (PUSCH) allocated to the UE 100. FIG. 8B denotes a timing at which the UE 100 generated the TCP ACK, as "T1". It is an ideal resource allocation (ideal allocation) that the appropriate amount of a PUSCH resource is allocated to the data amount of the TCP ACK at the "T1".

As illustrated in FIG. 8B, in the general uplink transmission procedure (Simple allocation) using the SR and the BSR, at a timing "T2" subsequent to the "T1" which is an ideal allocation timing, the PUSCH resource for the uplink data is allocated. Such an allocation is a too late allocation for the ideal allocation timing. Such too late allocation cannot reduce uplink latency.

On the other hand, in the uplink transmission procedure using the "Pre-grant", at a timing "T0" prior to the "T1" which is the ideal allocation timing, the PUSCH resource for the uplink data is allocated. Such an allocation is a too early allocation for the ideal allocation timing. In a case of such too early allocation, the PUSCH resource is allocated to the UE 100 in a state where an uplink data amount of the UE 100 is unknown. Therefore, an allocation resource amount can be too much (too much allocation) or too less (too less allocation).

Uplink Transmission Procedure According to Embodiment

Figure 9:
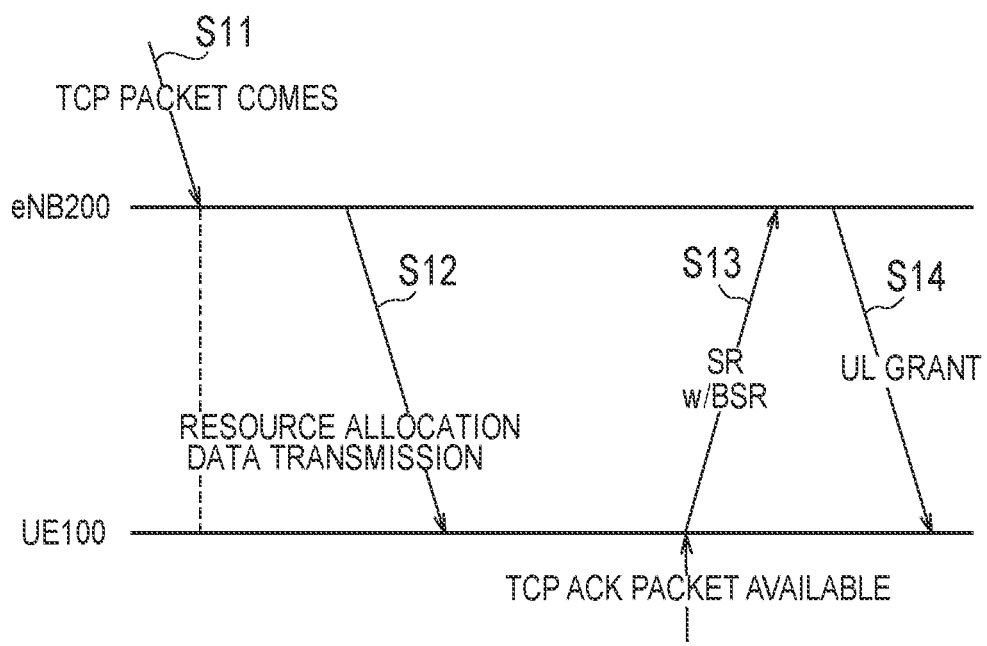
FIG. 9 is a diagram for describing an uplink transmission procedure according to the embodiment.

FIG. 9 is a diagram for describing an uplink transmission procedure according to the embodiment. In FIG. 9, the UE 100 is in a state of establishing the RRC connection with the eNB 200 (that is, the RRC connected mode). In this case, differences from FIG. 8A will be mainly described.

As illustrated in FIG. 9, in step S11, the eNB 200 receives a TCP packet (TCP segment) from the EPC 20.

In step S12, the eNB 200 uses a PDCCH resource to allocate a PDSCH resource to the UE 100. Further, the eNB 200 uses a PDSCH resource to transmit to the UE 100 downlink data corresponding to the TCP packet received from the EPC 20.

The UE 100 receives the downlink data and moves the downlink data to an upper layer of the UE 100. The upper layer of the UE 100 generates a TCP ACK to be notified to a lower layer of the UE 100. The UE 100 determines to request the eNB 200 to allocate a PUSCH resource, in response to the presence of uplink data (a TCP ACK packet) in a transmission buffer (the lower layer of the UE 100).

In step S13, the UE 100 uses a PUCCH resource to transmit to the eNB 200 an SR for requesting the allocation of the PUSCH resource. In the embodiment, the UE 100 includes, into the SR, the buffer information indicating the amount of uplink data in the transmission buffer of the UE 100. Hereinafter, such an SR is referred to as "SR w/BSR". The "SR w/BSR" is an SR to which a function of the BSR is added. By introducing the "SR w/BSR", it is possible to omit a BSR procedure (steps S5 and S6 in FIGS. 8A and 8B). Therefore, at a timing close to the ideal allocation timing, the eNB 200 can allocate the appropriate amount of the PUSCH resource to the UE 100. It should be noted that, although a general BSR is transmitted by using a PUSCH resource, the "SR w/BSR" is transmitted by using a PUCCH resource.

The buffer information included in the "SR w/BSR" is an index indicating an approximate amount of the uplink data in the transmission buffer of the UE 100. By using such an index, it is possible to reduce a data amount (bit length) of the "SR w/BSR". In the embodiment, the buffer information (index) has a bit length different from a bit length of other buffer information (that is, buffer information included in a normal BSR) transmitted by using a PUSCH resource. Specifically, the buffer information included in the "SR w/BSR" has a shorter bit length than the buffer information included in the normal BSR. For example, the buffer information included in the "SR w/BSR" has a bit length of two bits, and the buffer information included in the normal BSR has a bit length of six bits.

For example, an index "00" represents "less than 100 bytes", an index "01" represents "100 bytes or more and less than 500 bytes", an index "10" represents "500 bytes or more and less than 500 kbytes", and an index "11" represents "500 kbytes or more and less than 1 Mbyte". Upon using such indexes, the bit length of the buffer information is two bits. A correspondence relationship between such indexes for the "SR w/BSR" and a buffer amount may be configured by RRC signaling and the like, from the eNB 200. For example, an upper limit value and/or a lower limit value of each of the index "00", "01", "10", and "11" are configured in an RRC configuration.

Alternatively, the indexes may designate a BSR table as shown in Table 3. This designation is configured from the eNB 200 to the UE 100, or preconfigured to the UE 100. For example, the index "00" represents "Index 0 to 15" in the BSR table, the index "01" represents "Index 16 to 31" in the BSR table, the index "10" represents "Index 32 to 47" in the BSR table, and the index "11" represents "Index 48 to 63" in the BSR table. It is noted that, an example of dividing the BSR table into quarters is indicated here, but not limited to quarters. A correspondence relationship between such indexes for the "SR w/BSR" and indexes in the BSR table may be configured by RRC signaling and the like, from the eNB 200.

The "SR w/BSR" is transmitted by using a specific PUCCH format different from a PUCCH format (PUCCH format 1) used for transmitting a normal SR not including the buffer information. The specific PUCCH format is, for example, a new PUCCH format 1c. BPSK (one bit) or QPSK (two bits) is applied to the PUCCH format 1c. If this bit is mapped to the "SR w/BSR" and the PUCCH format 1c is transmitted, the eNB 200 recognizes that the received PUCCH includes the "SR w/BSR".

In step S14, the eNB 200 allocates an appropriate amount of a PUSCH resource to the UE 100, in response to reception of the "SR w/BSR". The UE 100 uses the PUSCH resources allocated from the eNB 200 to transmit to the eNB 200 the uplink data (TCP ACK packet) in the transmission buffer of the UE 100.

Summary of Embodiment

According to the embodiment, by introducing the "SR w/BSR", it is possible to omit the BSR procedure (steps S5 and S6 in FIGS. 8A and 8B). Therefore, at a timing close to the ideal allocation timing, the eNB 200 can allocate the appropriate amount of the PUSCH resource to the UE 100.

First Modification of Embodiment

Figure 10:
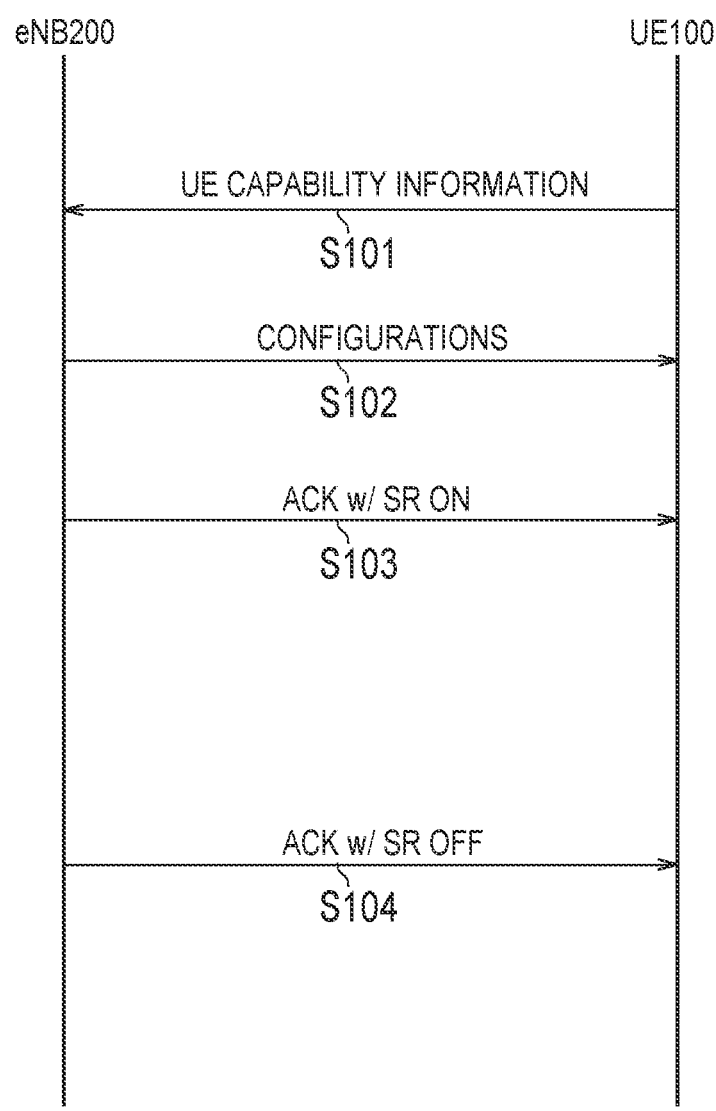
FIG. 10 is a diagram illustrating an operation according to a first modification of the embodiment.

The present modification relates to a method for appropriately controlling an operation according to the above-described embodiment. FIG. 10 is a diagram illustrating an operation according to the present modification. In an initial state in FIG. 10, the UE 100 is in the RRC connected mode in the cell of the eNB 200.

As illustrated in FIG. 10, the UE 100 transmits, to the eNB 200, capability information (UE Capability Information) indicating that the UE 100 has a function of transmitting the "SR w/BSR" (step S101). The eNB 200 receives the "UE Capability Information". However, the eNB 200 may acquire the "UE Capability Information" from the MME 300, without receiving the "UE Capability Information" from the UE 100. Based on the "UE Capability Information", the eNB 200 acknowledges that the UE 100 has the function of transmitting the "SR w/BSR".

Alternatively, the UE 100 may transmit, to the eNB 200, an interest notification indicating that the UE 100 has an interest in high-speed uplink access. The interest notification can be regarded as a configuration request for requesting a configuration related to the high-speed uplink access (that is, a configuration of the "SR w/BSR"). The interest notification may be transmitted from the UE 100 to the eNB 200 by "UE Assistance Information" that is one type of an RRC message. It is noted that, the UE 100 may transmit, to the eNB 200, either only one or both of the "UE Capability Information" and the interest notification (UE Assistance Information). Thus, the eNB 200 may acknowledge that the UE 100 has the function of transmitting the "SR w/BSR".

The eNB 200 transmits, to the UE 100, configuration information (Configurations) including various types of parameters (step S102). The various types of parameters include a parameter relating to the configuration of the "SR w/BSR". The UE 100 stores the Configurations (the various types of parameters). The eNB 200 and the UE 100 start transmission and reception of data. At this point, the transmission of the "SR w/BSR" is in an inactive state (deactive).

The eNB 200 transmits, to the UE 100, an instruction (SR w/BSR ON) for activating the transmission of the "SR w/BSR" (step S103). The "SR w/BSR ON" may be identified by a new DCI format. That is, the UE 100 interprets DCI to which the new DCI format is applied, as the "SR w/BSR ON". Alternatively, the "SR w/BSR ON" may be a flag included in a bit field in the DCI. The UE 100 activates the transmission of the "SR w/BSR", in response to reception of the "SR w/SBR ON".

Thereafter, the eNB 200 transmits, to the UE 100, an instruction (SR w/BSR OFF) for deactivating the transmission of the "SR w/BSR" (step S104). The "SR w/BSR OFF" may be identified by a new DCI format. That is, after activating the transmission of the "SR w/BSR", the UE 100 interprets, upon receiving DCI to which the new DCI format is applied, the DCI as the "SR w/BSR OFF". Alternatively, the "SR w/BSR OFF" may be a flag included in a bit field in the DCI. The UE 100 deactivates the transmission of the "SR w/BSR", in response to reception of the "SR w/BSR OFF". Thereafter, the UE 100 may retain the parameter relating to the configuration of the "SR w/BSR".

Second Modification of Embodiment

In the above-described first modification of the embodiment, the UE 100 activates or deactivates the transmission of the "SR w/BSR", according to the instruction from the eNB 200.

On the other hand, in the present modification, the UE 100 activates or deactivates the transmission of the "SR w/BSR", depending on the transmission buffer state of the UE 100. For example, similarly to a transmission trigger of the BSR, the UE 100 may be triggered by an increase of a buffer amount to activate the transmission of the "SR w/BSR". Alternatively, the UE 100 may activate the transmission of the "SR w/BSR" when the state has changed from a state in which originally no data is present in the transmission buffer of the UE 100, to a state in which data is generated therein.

Third Modification of Embodiment

In the above-described embodiment, an "LCG ID" is not particularly taken into consideration for the "SR w/BSR". In the present modification, a method of associating the "SR w/BSR" with the "LCG ID" will be described.

A first method is a method of simply notifying the "LCG ID" as well. Similarly to the conventional BSR, the UE 100 transmits the "SR w/BSR" in association with the "LCG ID". However, the first method is not preferable from the view point of overhead.

A second method includes the four pieces of buffer information (buffer size) into the "SR w/BSR". Similarly to the conventional "Long BSR", the UE 100 collectively transmits the four pieces of buffer information. The second method is also not preferable from the view point of the overhead.

A third method is a method of transmitting the "SR w/BSR" with including the buffer information indicating the total amount (total value) of four LCGs thereinto. It is possible to suppress an increase in overhead with this method. Further, the buffer is empty until the SR is transmitted, and hence, the necessity of dividing the buffer information for each LCG (LCG ID) is considered to be low, for the purpose of quickly transmitting the uplink data.

A fourth method is a method of permitting transmission of the "SR w/BSR" only for one predetermined LCG (LCG ID). For example, the one LCG (LCG ID) is predetermined as "LCG #0". Alternatively, in the RRC configuration, the eNB 200 designates the one LCG (LCG ID) to the UE 100. In this case, when a plurality of LCGs (LCG IDs) are designated as an option, the total value may be reported by shifting to the third method.

Other Embodiments

The buffer information included in the "SR w/BSR" may be an index representing the number of "TCP ACKs" waiting for transmission in the UE 100. For example, the index "00" represents a data amount equivalent to one TCP ACK, the index "01" represents a data amount equivalent to two TCP ACKs, the index "01" represents a data amount equivalent to two TCP ACKs, the index "11" represents a data amount equivalent to three TCP ACKs. Such a correspondence relationship may be defined beforehand by the specification of the LTE system. Alternatively, such a correspondence relationship may be designated by RRC signaling or the like from the eNB 200 to the UE 100.

In the above-described embodiment, although an example of the high-speed access technology of the TCP ACK is mainly described, the present application is not limited thereto. The "SR w/BSR" according to the above-described embodiments can be applied to the application other than the TCP ACK. For example, the "SR w/BSR" can be applied to communication requiring high-speed access and high reliability.

Further, in the above-described embodiment, although an uplink resource allocation is mainly exemplified, the present application is not limited thereto. For example, the "SR w/BSR" can be applied to a resource allocation of a side link (for example, D2D communication). In this case, when performing the side link resource allocation by the PDCCH (or RRC signaling), the "SR w/BSR" can be applied.

In the above-described embodiment, UE capability information (UE capability) notified from the UE 100 to the network was not specifically mentioned. However, a UE which applies an "SR with BSR" may be identified by the capability directly indicating that the UE has a capability of the "SR with BSR", and additionally, for example, the "SR with BSR" may be applied to a UE compatible with a V2X service and a UE executing a V2X service.

In the above-described embodiment, as a trigger for the UE 100 to transmit the "SR with BSR", the reception of a DL TCP packet has been mentioned. However, this is not essential and a packet purely generated in the UE may be a trigger. Further, before a transmission packet is generated, the UE may predict a generation timing of the packet and trigger the transmission. Such a prediction is suitable for a message or the like in which a transmission periodicity is determined depending on a vehicle speed, such as a CAM (Cooperative Awareness Message) message in the ITS field.

In the above-described embodiment, the LTE system is exemplified as the mobile communication system. However, the present application is not limited to the LTE system. The present application may be applied to a system other than the LTE system.

APPENDIX

1. Introduction

A new study item on latency reduction techniques for LTE was approved. The objective of the study identifies two technical areas to reduce packet data latency as follows.
Fast uplink access solutions [RAN2]:
TTI shortening and reduced processing times [RAN1]:
The fast uplink access solution is expected to improve resource efficiency comparing to some implementation techniques with and without preserving the current TTI length and processing time, i.e., TTI shortening.
In this appendix, the initial consideration to study on fast uplink access solution is provided.

2. Discussion (2.1. Working Assumptions)
The motivation documents of this study show that the current standardized mechanism for uplink resource allocation compress the potential throughput performance of LTE from TCP throughput perspective. The degradation of TCP throughput is caused by the TCP slow start algorithm due to round-trip-time latency, i.e., TCP-ACK transmission in UL. So, the fast uplink access solution is expected to improve user experiences provided by upper layer built on TCP layer. For the working assumptions, the SID mentions for the fast uplink access solutions.

The study area includes resource efficiency, including air interface capacity, battery lifetime, control channel resources, specification impact and technical feasibility. Both FDD and TDD duplex modes are considered.

As first aspect, potential gains like reduced response time and improved TCP throughput due to latency improvements on typical applications and use cases are identified and documented. In this evaluation RAN2 may assume latency reductions due to protocol enhancements as well as shortened TTIs. In conclusion, this aspect of the study is supposed to show what latency reductions would be desirable [RAN2].

The solutions are expected to improve network capacity, UE power consumption, control channel resources. Especially, improved TCP throughput could be considered as a key performance indicator.

Observation 1: DL TCP throughput is expected to be improved by UL latency reduction solutions.

For the fast uplink access solution-specific aspect; for active UEs and UEs that have been inactive a longer time, but are kept in RRC Connected, focus should be on reducing user plane latency for the scheduled UL transmission and getting a more resource efficient solution with protocol and signaling enhancements, compared to the pre-scheduling solutions allowed by the standard today, both with and without preserving the current TTI length and processing times;

The active UE is assumed to be transmitting/receiving the data continuously, so the UE is considered to be in Active Time, i.e., DRX is not applied because of the inactivity timer running.

Observation 2: UEs in Active Time are taken into account.

The UE that has been inactive for a longer time but is kept in RRC Connected could be interpreted that the UE applies the long DRX cycle and needs at least to send SR and BSR to perform uplink transmission. In addition, when the time alignment timer, TAT, has expired the UE initiates the random access procedure before SR transmission, which degrades user experience, i.e., response time in practice.

Observation 3: UEs with applying long DRX cycle and no UL grant are taken into consideration.

Observation 4: Time alignment timer may have expired if the UE has been inactive for a long time.

Compared to the pre-scheduling solution, the fast uplink access solution should be more resource efficient even if the current TTI length and processing times are assumed. The TTI shortening is more generic solution and is expected to reduce the latency of uplink access latency as well as downlink delivery thanks to increased HARQ interactions.

Observation 5: The fast uplink solution has gains independent of TTI shortening approach.

It is mentioned in the motivation documents that a possible approach for the fast uplink access is based on an implementation technique, the pre-scheduling whereby the eNB allocates uplink resources before SR reception. However, the pre-scheduling technique consumes radio resources in uplink (i.e., PUSCH) and downlink control channel (i.e., PDCCH) even if the UE has no uplink data to send. It is also discussed that in case the existing SPS is used for the pre-scheduling, the UE needs to transmit padding data to avoid the implicit release of configured SPS resources. So, the motivation documents proposed that standardized approaches are expected to enhance the pre-scheduling technique, which may include pre-grant, SPS-like mechanism, no padding when no data is available and/or smooth transition to dynamic scheduling.

Observation 6: The standardized approach is expected to enhance resource efficiency compared to the implementation technique.

(2.2. Typical Use Cases)

The increase of today's mobile traffic is caused by the growth of mobile video traffic and this trend is expected to dominate future traffic according to public reports. It is well-known that video streaming typically uses TCP (HTTP over TCP), unless it's for live-streaming (over UDP). So, the use case of video streaming is in-line with the scope of this study.

The reports also point out that the social networking and web browsing use mobile traffic as the second dominant applications, whereby these applications are typically built on HTTP and therefore uses TCP. As many 3GPP delegates are already familiar with, the 3GPP FTP service may be continually accessed by each delegate to download Tdocs, which also uses TCP. Therefore, the behaviours on the applications built on HTTP or FTP should be considered as typical use cases.

Proposal 1: User behaviours on the applications built on HTTP and FTP should be considered as typical use cases in this study.

FIG. 11 is a diagram illustrating top five apps by mobile traffic volume and analyzing mobile applications.

Figure 12:
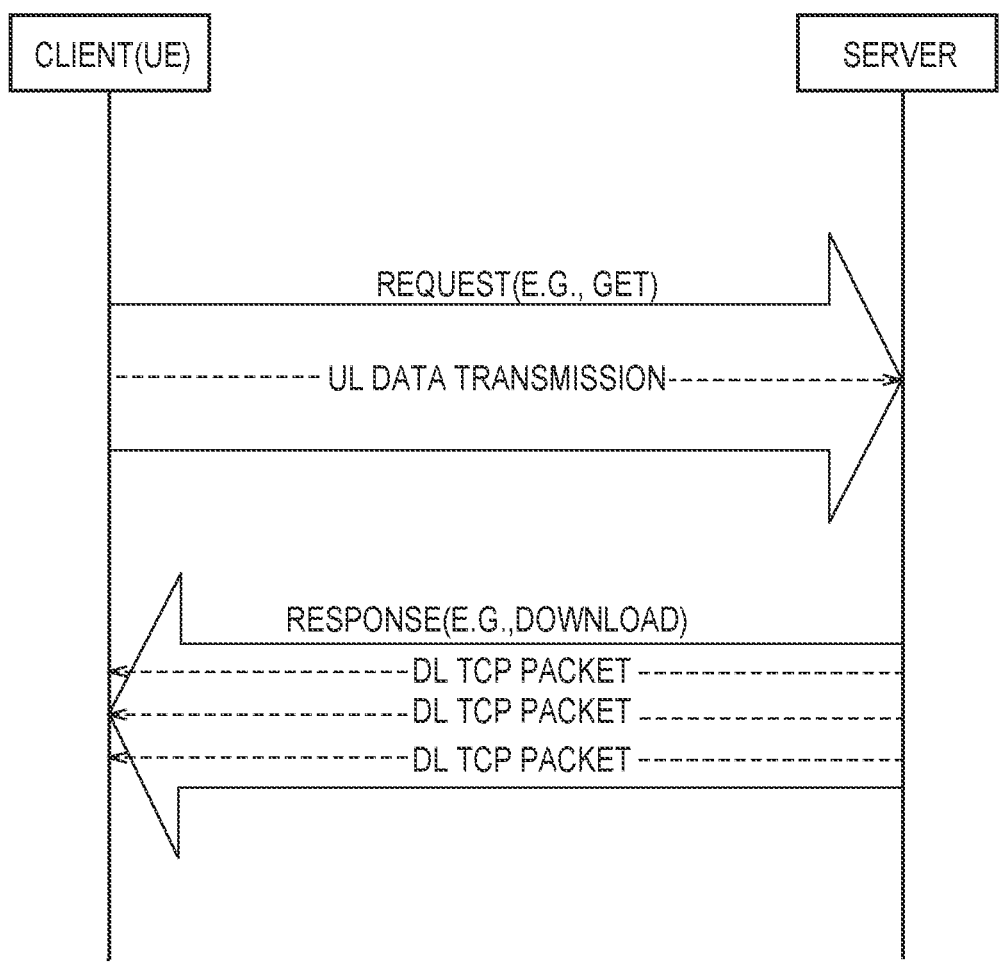
FIG. 12 is a diagram according to the appendix of the embodiment.

The most typical behaviour on such application can be modelled as a request/response dialog. For example, when the user wants to download a file over FTP, the client sends the RETR command (a.k.a., get) to the server first and then the file downloading starts. The same behaviour is also applicable to HTTP, whereby the web browser sends GET first then the webpage is downloaded when the user opens the webpage, as illustrated in FIG. 12. Considering the typical behaviour, RAN2 should discuss whether the first uplink data transmission in advance of corresponding DL TCP packet (e.g., a request like GET) can be just assumed or should be also enhanced in the fast uplink access solutions.

Proposal 2: RAN2 should discuss whether the first uplink data transmission in advance of corresponding DL TCP packet can be just assumed or should be also enhanced in the fast uplink access solutions.

FIG. 12 is a diagram illustrating modelling of typical use case with HTTP/FTP.

(2.3. Essential Issues)

Figure 13:
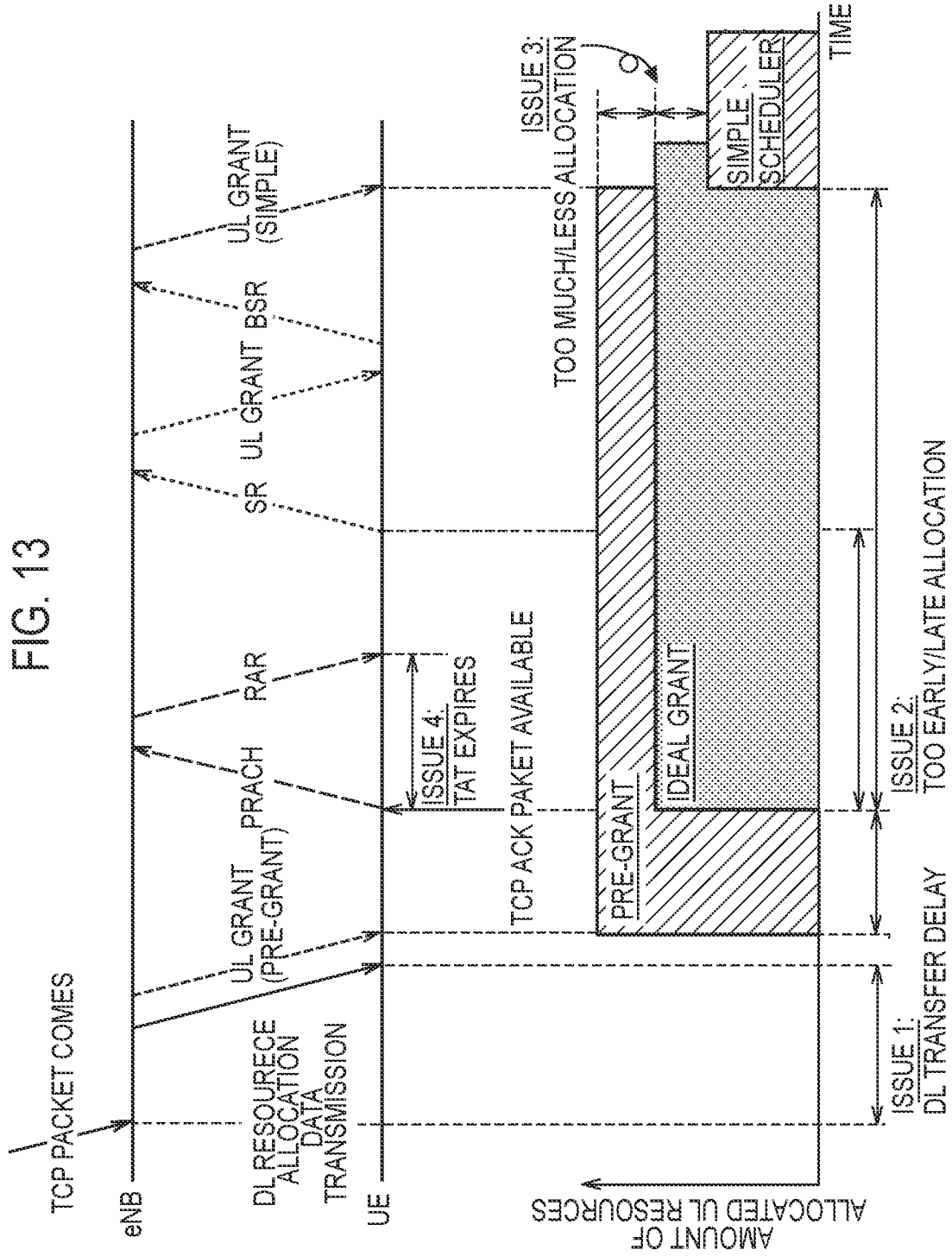
FIG. 13 is a diagram according to the appendix of the embodiment.

As mentioned in section 2.1, the critical issues leading to uplink access latency cannot be resolved by either the pre-scheduling technique or the pre-grant technique using enhanced SPS. FIG. 13 illustrates three critical issues that should be addressed by fast uplink access solutions (refer to FIG. 13).

Critical Issue 1: DL Transfer Delay

DL transfer delay is caused by the long DRX cycle. In the worst case, the serving cell needs to wait for the transmission opportunity during 10-2560 subframes after DL TCP packet reception.

Critical Issue 2: Too Early/Late Allocation

Too early allocation may be caused by the pre-scheduling technique or the pre-grant approach before SR reception. On the other hand, too late allocation is possible due to the SR periodicity, i.e., the SR period*sr-ProhibitTimer, or a scheduler implementation that is too simple, i.e., one that allocates uplink resources for the TCP ACK packet based on corresponding BSR reception (so 7 subframes after UE's SR transmission).

Critical Issue 3: Too Much/Less Allocation

Too much/few allocation may be caused by the pre-scheduling technique or the pre-grant approach before BSR. Without knowledge of UE's buffer status, the scheduler needs to blindly allocate the uplink resources.

Critical Issue 4: Initial Uplink Delay

As stated in Observation 4, the UE should initiate the random access procedure before any uplink transmission when TAT expires.

Of course, smart implementations may reduce some of the negative impacts due to the three critical issues, e.g., comprehending inside of the DL IP packet and allocating uplink resources based on usage of previous uplink grants. However, the standardized approach will be expected to resolve most if not all the issues listed above.

Proposal 3: DL transfer delay, too early/late allocation, too much/less allocation, TAT expiry should be optimized by the fast uplink access solutions.

(2.4. Potential Solution Approaches)

As discussed in section 2.3, the critical issues will not be resolved, unless the DRX, SR, BSR and/or procedures are revisited. These issues will not addressed even if the pre-grant approach using enhanced SPS is applied, since the mismatch the actual grant and ideal allocation (FIG. 13)

causes worse resource efficiency, including air interface capacity, battery lifetime, control channel resources.

Observation 7: While the pre-grant approach may have better performance compared to the existing implementation technique, it will still not resolve the critical issues.

To resolve the critical issues, the following solution approaches may be considered.

Extended OnDuration handling in DRX for the fast DL allocation, e.g., triggered by the first UL transmission (i.e., GET).

Reduction of signalling round-trip for the first UL packet transmission, e.g., by integrating SR and BSR.

Shorter SR periodicity with less impact to spectral efficiency [RAN1].

RACH procedure enhancements, e.g., with additional functionality for UL data grant.

Therefore, RAN2 should study not only UL grant mechanism itself but also the procedures related to UL grant.

Proposal 4: RAN2 should also study the enhancements of DRX, SR, BSR and RACH.

3. Conclusion

In this appendix, the working assumptions are suggested based on the approved work item description. The typical use cases and the modelling are provided. Four critical issues and potential solution approaches are identified for this study.

INDUSTRIAL APPLICABILITY

The present application is useful in the field of communication.

The invention claimed is:

1. A radio terminal configured to use a PUSCH resource to transmit uplink data to a base station, comprising:
a controller configured to perform a process of transmitting, to the base station, by using a PUCCH resource, a special scheduling request for requesting allocation of the PUSCH resource, wherein
the special scheduling request includes buffer information indicating an amount of the uplink data in a transmission buffer of the radio terminal,
the controller is configured to perform a process of transmitting capability information to the base station, the capability information indicating that the radio terminal is capable of transmitting the special scheduling request,
the controller is configured to perform a process of receiving configuration information from the base station, the configuration information indicating parameters on transmitting the special scheduling request,
the controller is configured to perform a process of deactivating the parameters on transmitting the special scheduling request when receiving the configuration information, and
the controller is further configured to activate the parameters on transmitting the special scheduling request and activate transmission of the special scheduling request, in response to receiving an instruction from the base station, the instruction being different from the configuration information.

2. The radio terminal according to claim 1, wherein
the buffer information is an index indicating an approximate amount of the uplink data in the transmission buffer.

3. The radio terminal according to claim 2, wherein
the index has a bit length different from a bit length of other buffer information transmitted by using a PUSCH resource.

4. The radio terminal according to claim 2, wherein
a correspondence relationship between the index and the approximate amount is configured from the base station.

5. The radio terminal according to claim 1, wherein
the special scheduling request including the buffer information is transmitted by using a specific PUCCH format different from a PUCCH format used for transmitting a scheduling request not including the buffer information.

6. The radio terminal according to claim 1, wherein
the buffer information indicates a total uplink data amount of a plurality of logical channel groups.

7. The radio terminal according to claim 1, wherein
the buffer information indicates an uplink data amount in a certain logical channel group among a plurality of logical channel groups.

8. The radio terminal according to claim 1,
wherein the instruction is an acknowledgement of the special scheduling request.

9. A base station configured to use a PUSCH resource to receive uplink data from a radio terminal, comprising:
a controller configured to perform a process of receiving, from the radio terminal, by using a PUCCH resource, a special scheduling request for requesting allocation of the PUSCH resource, wherein
the special scheduling request includes buffer information indicating an amount of the uplink data in a transmission buffer of the radio terminal,
the controller is configured to perform a process of receiving capability information from the radio terminal, the capability information indicating that the radio terminal is capable of transmitting the special scheduling request,
the controller is configured to perform a process of transmitting configuration information to the radio terminal, the configuration information indicating parameters on transmitting the special scheduling request,
the parameters on transmitting the special scheduling request is deactivated by the radio terminal when the radio terminal receives the configuration information, and
the controller is further configured to perform a process of transmitting, to the radio terminal, an instruction being different from the configuration information, the instruction instructing to activate transmission of the special scheduling request.

10. A processor configured to control a radio terminal configured to use a PUSCH resource to transmit uplink data to a base station, wherein the processor is configured to:
execute a process of transmitting, to the base station, by using a PUCCH resource, a special scheduling request for requesting allocation of the PUSCH resource, wherein
the special scheduling request includes buffer information indicating an amount of the uplink data in a transmission buffer of the radio terminal,
the processor is configured to execute a process of transmitting capability information to the base station, the capability information indicating that the radio terminal is capable of transmitting the special scheduling request,
the processor is configured to execute a process of receiving configuration information from the base station, the configuration information indicating parameters on transmitting the special scheduling request, the processor is configured to perform a process of deactiving the parameters on transmitting the special scheduling request when receiving the configuration information, and the processor is configured to activate the parameters on transmitting the special scheduling request and activate transmission of the special scheduling request, in response to receiving an instruction from the base station, the instruction being different from the configuration information.

\* \* \* \* \*